Nov. 17, 1936.  T. G. MELISH  2,061,518
SIFTER
Filed Dec. 5, 1933

INVENTOR
Thomas G. Melish,
BY
Wood & Wood,
ATTORNEYS

Patented Nov. 17, 1936

2,061,518

UNITED STATES PATENT OFFICE 2,061,518

SIFTER

Thomas G. Melish, Cincinnati, Ohio, assignor to The Bromwell Wire Goods Company, Cincinnati, Ohio, a corporation of Delaware Application December 5, 1933, Serial No. 700,997

1 Claim. (Cl. 209—374)

This invention relates to kitchen utensils and is particularly directed to an improved sifter for flour and the like.

The sifter to which the present improvements are directed is of the character known as a multiple sifter, that is to say, one in which a series of sifting operations can be performed without removing the contents from the container. For this purpose a screen is located intermediate of the sifter and the contents are worked from one end of the container to the other.

It is the object of this invention to improve the general construction of this type of sifter by the provision of an improved agitator for contacting the screen and causing the material to pass through the same, the handle for operating the agitator being disposed in an improved arrangement relative to the sifter casing for convenience in operation and efficiency in assembly.

Other objects and further advantages will be more fully apparent from a description of the accompanying drawing, in which.

Figure 1:
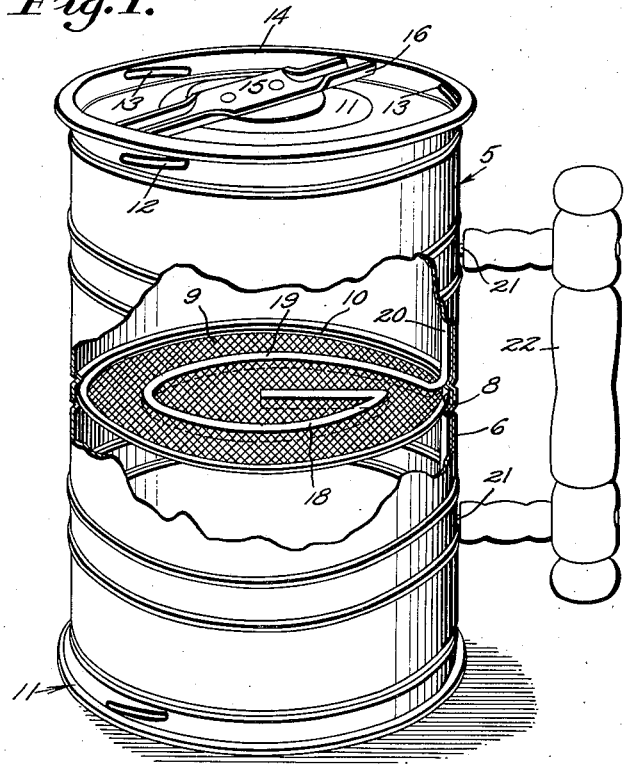
Figure 1 is a perspective view of the improved sifting device.
Figure 2:
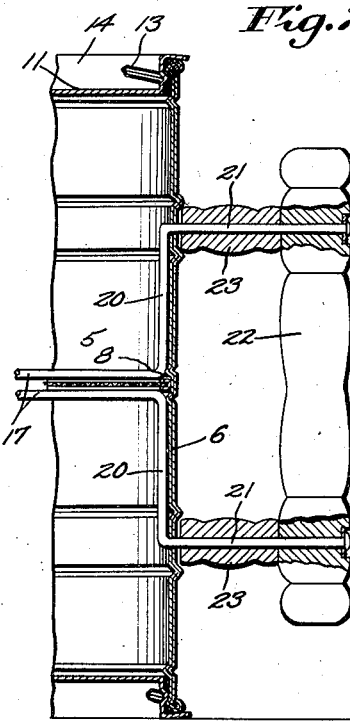
Figure 2 is a fragmentary longitudinal sectional view thereof, illustrating the arrangement of the agitators and the handle therefor relative to the casing.
Figure 3:
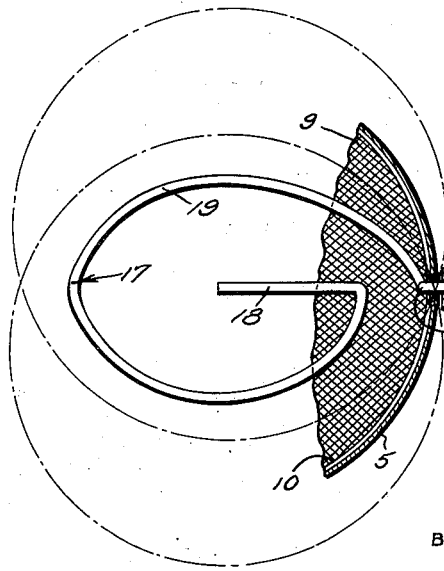
Figure 3 is a sectional view taken on line 3—3, Figure 1.

Referring to the drawing, the cylindrical casing or body of the sifter is indicated at 5 being formed from a sheet of tin secured together along a longitudinal seam indicated at 6. A number of annular grooves or cylindrical corrugations 7 are formed to strengthen the body of the device. Intermediate of the cylindrical body, spaced corrugations are formed inwardly providing an annular groove 8 therebetween. The sifter screen, which is in the form of a circular disc 9 having a metal binding strip 10 around the edge thereof, is placed within this groove.

A cap or cover 11 is provided for each end of the cylindrical body. These caps are recessed and a bayonet type of fastening means is employed. For this purpose, inclined ribs 12, 12, are formed around the end margin of the cylindrical body projecting inwardly. Likewise, cooperating ribs 13, 13, are struck from the circular lid flange 14 which extends longitudinally into the body of the sifter. When the lid is inserted in the end of the casing and rotated, the inclined ribs 14 thereof engage under the inclined ribs 13 of the casing and cause an inward clamping action to take place.

A handle 15 for each lid is provided in the form of a strip of metal riveted diametrically across the outer face of the lid and having its end side edges rolled as at 16 to provide gripping portions.

An agitator device 17 is formed of heavy wire. An element 18 of the agitator engages each side of the screen and consists of a length of wire. Each of these elements includes a substantially spiral portion 19 lying against the face of the screen, the wire extending to the inner wall of the casing adjacent the seam thereof and extending longitudinally as at 20 toward the end of the cylindrical casing, and then turned at right angles and projected outwardly as at 21 through an aperture in the seam and anchored in a handle bar 22 extended longitudinally of the casing at the outside thereof. The end of the wire is riveted in position.

It will be seen that the respective outer ends of the lengths of wire are secured in opposite ends of the handle bar. The space between the outwardly extended wire portions is sufficient for entry of the fingers of the hand so that convenient grip can be had on the handle bar. In order to prevent inward displacement of the radially extended agitator portions 21 where they project through the wall of the receptacle, spacer sleeves 23 are provided on these portions between the handle bar and the casing. The handle bar and the spacer sleeves are preferably of wood and may be turned for embellishment. The portions 20 of the agitator wires lying against the inner side of the casing prevent outward displacement of the agitator.

Since the agitator elements extend through the seam portion of the receptacle, a fairly substantial bearing is obtained. The device is operated by swinging the body 5 of the sifter including the screen on the agitator and handle assembly. That is to say, the handle is gripped firmly in the hand and a horizontal oscillating motion is imparted, thus causing the wire screen to pass back and forth between the agitator portions, the agitation of the screen causing the flour or other material to pass through and be deposited in the lower end of the casing. When all of the flour is passed through, the operator turns the casing end for end and repeats the procedure. Thus the flour can be sifted any number of times without removing it from the container.

The fabrication of the agitator is highly efficient and the arrangement facilitates operation. The assembly is quite sturdy and the agitator is firmly mounted in position and cannot be easily displaced.

Figure 4:
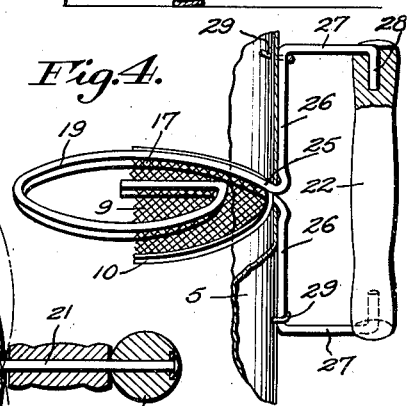
Figure 4 is a fragmentary sectional perspective view of a modified form of the agitator unit.

The modified form of the invention shown in Figure 4 incorporates an arrangement of the agitator elements 17, whereby the screen contacting portions 19 provide shoulder portions 25 abutting the inner side of the receptacle and turn angularly through the wall of the receptacle, each having a portion 26 extending longitudinally toward the end of the receptacle against the outer side thereof. From this longitudinal portion, the wire is turned angularly outwardly as at 27 and then downwardly as at 28 into an axial bore in the end of the handle bar.

Clips 29, engaged around the upper ends of the longitudinally extended portions, secure the agitator elements in position and provide the pivot point for oscillation of the receptacle on the agitator assembly as heretofore described.

Having described my invention, I claim:

A sifting device, comprising, a cylindrical receptacle, a screen mounted within said receptacle intermediate of the ends thereof, agitator elements mounted above and below the screen, each element consisting of a portion engaging a face of the screen and an extended portion lying along the inner wall of the receptacle longitudinally thereof, said latter portion extended toward a respective end of the receptacle and having its end turned outwardly and projected through the wall of the receptacle, spacer sleeves mounted about the outwardly extended portions of the agitator elements, and a handle bar connecting the extreme outer ends of the outwardly extended portions of the agitator elements and abutting said spacer sleeves, said spacer sleeves substantially filling the space between the receptacle and the handle, the extreme ends of the outwardly extended portions of the agitator elements having formed heads for preventing displacement of the handle bar and spacer sleeves from said outwardly extended portions.

THOMAS G. MELISH.